June 12, 1928.
R. P. NICHOLS
1,672,900
DIRIGIBLE LIGHT
Filed June 11, 1925
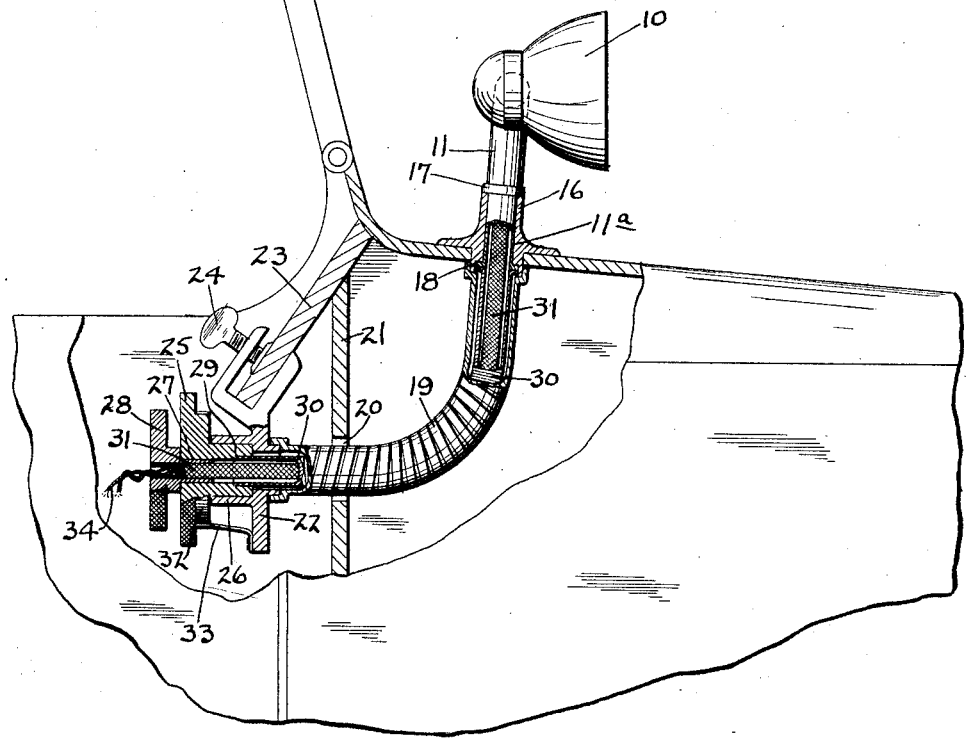
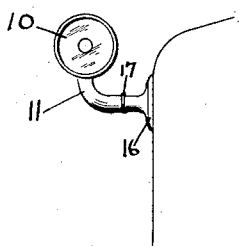
INVENTOR
ROBERT P. NICHOLS
BY
ATTORNEYS Patented June 12, 1928.

1,672,900

UNITED STATES PATENT OFFICE.

ROBERT P. NICHOLS, OF NEW ROCHELLE, NEW YORK.

DIRIGIBLE LIGHT.

Application filed June 11, 1925. Serial No. 36,343.

This invention relates to improvements in dirigible searchlights or spotlights for automobiles, motor boats or other vehicles and particularly to the type of spotlight illustrated and described in my copending application, Serial No. 757,997.

It is an object of the invention to provide a dirigible spotlight for automobiles or the like which may be mounted on the deck or cowl or other desired place outside the passenger compartment and be controlled from within the passenger compartment of either an open or closed automobile without necessitating holes or openings through the windshield or other transparent parts of the automobile body.

Another object of the invention is to provide a searchlight or spotlight for automobiles or the like controlled from a point removed from the light, which may be turned through an angle of 360° or more in both vertical and horizontal planes, making it possible to direct the light in any direction, with a minimum amount of movement.

Another object of the invention is to provide a controlling device for a spotlight of the type described by which both the horizontal and vertical movements of the light are directed by rotary motion of the controlling handles.

A further object of the invention is to provide a rugged weatherproof fixture for a dirigible spotlight with a minimum number of moving parts and with enclosed electrical connections, at a minimum cost of manufacture.

Other objects of the invention will be manifested as the description of the invention proceeds.

Referring now to the drawings which illustrate a preferred form of embodiment of the invention, Figure 1 is a part sectional elevational view of a portion of an automobile with the light of my invention mounted thereon:

Figure 2 is a slightly enlarged front view partly in section of the light and bracket shown in Figure 1.

Figure 3 is a front view of the spotlight mounted in a different position on the automobile.

In the form of embodiment illustrated in Figures 1 and 2 a spotlight 10, is pivotally mounted on an elbow 11 carried on the cowl of the automobile by means of a short hollow shaft 12 which is rotatably mounted in the elbow 11 and is held against longitudinal motion by a slip ring 13 running in the groove 14 on the shaft 12. The slip ring 13 is secured in the elbow 11 by means of screws 15. The elbow 11 is bent through an angle of approximately 90° to bring the free end thereof approximately parallel with its support and its lower end is rotatably mounted in a bracket 16 which is rigidly attached to the automobile.

In Figures 1 and 2 I have shown this bracket 16 attached to the deck or cowl of the automobile just in front of the windshield and in Figure 3 I have shown the bracket attached to the side of the automobile, adjacent the windshield but it will be evident as the description proceeds that it may be attached to any part of the automobile and at any angle without impairing the operation of the spotlight in any way.

A ring 17 threaded on the upper end of the bracket 16 prevents longitudinal motion of the elbow 11 in the bracket 16 and acts as a seal to prevent water from seeping in between the elbow 11 and the bracket 16. A collar 18 of the bracket 16 extends through the deck of the automobile and one end of a flexible casing 19 is threaded onto this collar and a portion 11$^a$ of the elbow 11 extends through the bracket 16 and collar 18.

The flexible casing 19 passes through a hole 20 in the cowl board 21 of the automobile and the other end of the casing is rigidly attached to a bearing plate 22, which is removably mounted on the instrument board 23 of the automobile by the clamp 24 formed integral with the plate 22.

A knurled hand wheel 25 is mounted in a suitable bearing 26 in the bearing plate 22 and itself forms a bearing 27 for a second and smaller knurled hand wheel 28 mounted therein. The handwheel 25 has a hub 29 to which is attached by any suitable means such as soldering, a flexible hollow shaft 30 whose other end is attached to the end 11$^a$ of the elbow 11. The hollow shaft 30 rotates within the casing 19 when the handwheel 25 is turned and turns the elbow 11 in the bracket 16.

A smaller hollow shaft 31 is attached to the hand wheel 28 and extends through the hollow shaft 30 and the elbow 11 to the hollow shaft 12 on which the spotlight 10 is mounted. The shaft 31 is freely rotatable within the shaft 30 and hence when the hand wheel 28 is turned the spotlight is rotated about the axis of the short hollow shaft 12.

It will thus be seen that with the spotlight mounted as in Figures 1 and 2 rotation of the handwheel 25 will cause the light to turn in a horizontal plane around its pivot in the bracket 16 while rotation of the handwheel 28 will cause the light to rotate in a vertical plane around the pivot in the end of the elbow 11, and that each pivot permits a movement of 360° or more.

In order to permit easy adjustment of the light with one hand the wheel 28 is mounted in the wheel 25 with enough friction between the two to cause the smaller wheel 28 to turn when the wheel 25 is turned, thereby imparting simultaneous and uniform rotation to the shafts 30 and 31. A very slight amount of friction will secure this result as the end of the shaft 31 which is secured to the shaft 12 turns with the elbow 11 when it is rotated and tends to cause the other end of the shaft 31 to turn with the shaft 30 or hand wheel 25. A ratchet 32 integral with the hand wheel 25 is engaged by a spring arm 33 with enough pressure to prevent the hand wheel 25 from rotating unless turned by the hand. Both wheels therefore turn when the wheel 25 is turned to adjust the light in a horizontal plane, but the spring 33 holds the wheel 25 stationary while the wheel 28 is manipulated to adjust the light in a vertical plane.

In order to direct the spotlight at an object the large wheel 25 is turned, the wheel 28 turning therewith, until the light moving in a horizontal plane has reached a point in line with the object, the smaller wheel 28 is then turned if necessary until the light is thrown upon the object.

It will be noted that the spotlight may be rotated in both planes through more than 360° and this has a distinct advantage. If the rotation were limited to 360° and the light turned upon an object in a direction near one limit of rotation it would be necessary to turn the lamp completely around in order to attain a direction near the other limit of rotation. With the present invention the light may be rotated completely around thereby eliminating such unnecessary turning of the hand wheels and allowing easy and rapid adjustment of the light in any direction.

The wires 34 which conduct current to the light are passed through the hollow shafts 31 and 12 to the light 10 and are completely enclosed and protected from the weather and from the danger of being broken from bending or twisting as such twisting and bending is spread out over the length of the wire and does not occur at any one place. Continued rotation of the light in one direction merely twists or untwists the strands of the wires.

As illustrated in Figure 3 the light may be mounted upon the side of the car in the approximate line of the windshield or upon the side posts of the windshield and in this position the elbow 11 rotates in the vertical plane about a horizontal pivot and the shaft 12 and light 10 rotates in a horizontal plane at the end of the elbow.

In this case the vertical rotation of the lamp is accomplished by the large handwheel 25 and the horizontal rotation by the small handwheel 28, the operation being identical as described in the preceding figures.

While I have described and illustrated one possible form of embodiment of my invention it is to be understood that the invention is not limited to this particular embodiment and that various modifications and changes may be made in the embodiment illustrated without departing from the spirit of the invention or the scope of the appended claims.

I claim:

1. In a dirigible light for automobiles or the like an elbow, a light rotatably supported in said elbow on an axis normal to the axis of said light, a bracket rotatably supporting said elbow, a flexible hollow shaft attached to said elbow, a flexible shaft within said first mentioned flexible shaft, extending through said elbow and attached directly to said light, and means for turning either or both of said flexible shafts to control the direction of the light.

2. In a dirigible light for automobiles and the like an elbow, a light rotatably supported in said elbow on an axis normal to the axis of said light, a bracket rotatably supporting said elbow, a hollow flexible cable extending from said bracket to the interior of the automobile, a flexible hollow shaft in said cable attached to said elbow, a handwheel attached to said shaft, a second hollow flexible shaft within said first shaft and said elbow and attached to said light, a handwheel attached to the end of said inner shaft, and electrical connectors within the inner flexible shaft.

3. In a dirigible light for automobiles and the like an elbow, a light rotatably supported in said elbow on an axis normal to the axis of said light, a bracket rotatably supporting said elbow, a hollow flexible cable extending from said bracket to the interior of the automobile, a flexible hollow shaft in said cable attached to said elbow, a handwheel attached to said shaft, a second hollow flexible shaft within said first shaft and said elbow and directly attached to said light, a handwheel attached to the end of said inner shaft, electrical connectors within the inner flexible shaft, means to hold the two handwheels in frictional engagement with each other and independent holding means for one of said wheels to hold it against rotation when said other wheel is rotated.

In testimony whereof I have affixed my signature to this specification.

ROBERT P. NICHOLS.